(12) United States Patent
Chou (10) Patent No.: US 8,253,535 B2
(45) Date of Patent: Aug. 28, 2012

(54) ELECTRONIC DEVICE AND ACCESS CONTROLLING METHOD THEREOF

(75) Inventor: Meng-Chieh Chou, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 608 days.

(21) Appl. No.: 12/507,151

(22) Filed: Jul. 22, 2009

(65) Prior Publication Data

US 2010/0097177 A1 Apr. 22, 2010

(30) Foreign Application Priority Data

Oct. 17, 2008 (CN) .......................... 2008 1 0304970

(51) Int. Cl.
*G06K 9/00* (2006.01)
(52) U.S. Cl. ................. 340/5.83; 340/5.52; 340/5.53; 340/5.82; 382/115; 382/117
(58) Field of Classification Search ............... 340/5.52, 340/5.53, 5.82, 5.83; 382/115, 117
See application file for complete search history.

(56) References Cited

U.S. PATENT DOCUMENTS

| | | | | |
|---|---|---|---|---|
| 4,641,349 A * | 2/1987 | Flom et al. | | 382/117 |
| 7,123,751 B1 * | 10/2006 | Fujieda | | 382/115 |
| 7,623,686 B2 * | 11/2009 | Kondo et al. | | 382/117 |
| 2001/0026632 A1 * | 10/2001 | Tamai | | 382/116 |
| 2003/0061233 A1 * | 3/2003 | Manasse et al. | | 707/104.1 |
| 2003/0076984 A1 * | 4/2003 | Tisse et al. | | 382/117 |
| 2005/0069179 A1 * | 3/2005 | Hwang et al. | | 382/124 |
| 2005/0129286 A1 * | 6/2005 | Hekimian | | 382/117 |
| 2006/0120570 A1 * | 6/2006 | Azuma et al. | | 382/117 |
| 2006/0147094 A1 * | 7/2006 | Yoo | | 382/117 |
| 2007/0047772 A1 * | 3/2007 | Matey et al. | | 382/117 |
| 2007/0050303 A1 * | 3/2007 | Schroeder et al. | | 705/67 |
| 2007/0110285 A1 * | 5/2007 | Hanna et al. | | 382/117 |
| 2007/0216798 A1 * | 9/2007 | Northcott et al. | | 348/370 |
| 2008/0095411 A1 * | 4/2008 | Hwang et al. | | 382/117 |
| 2009/0207251 A1 * | 8/2009 | Kobayashi et al. | | 348/156 |
| 2010/0014718 A1 * | 1/2010 | Savvides et al. | | 382/117 |

FOREIGN PATENT DOCUMENTS

CN 1549188 A 11/2004

* cited by examiner

*Primary Examiner* — Jennifer Mehmood
*Assistant Examiner* — Andrew Bee
(74) *Attorney, Agent, or Firm* — Altis Law Group, Inc.

(57) ABSTRACT

An electronic device and method for controlling access to an electronic device includes acquiring a login iris image of a user, and computing iris characteristic values according to iris characteristic points in the login iris image. The electronic device and method further includes obtaining original iris characteristic values of one or more authorized users of the electronic device, and determining an identification of the user by determining if the computed iris characteristic values match the original iris characteristic values of the one or more authorized users.

20 Claims, 7 Drawing Sheets

ELECTRONIC DEVICE AND ACCESS CONTROLLING METHOD THEREOF

BACKGROUND

1. Technical Field

Embodiments of the present disclosure relate to access controlling, and more particularly to an electronic device and method for controlling access to the electronic device by identifying iris of users.

2. Description of Related Art

Electronic devices may be used to store various kinds of private information (e.g., personal data, phone lists, message records, trading information and call histories, etc). Since such private information may be confidential, leakage of such private information may result in many problems. Many electronic devices provides passwords to ensure information security. However, passwords are easily cracked or forgotten.

What is needed, therefore, is an improved electronic device and method for controlling access to the electronic device.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
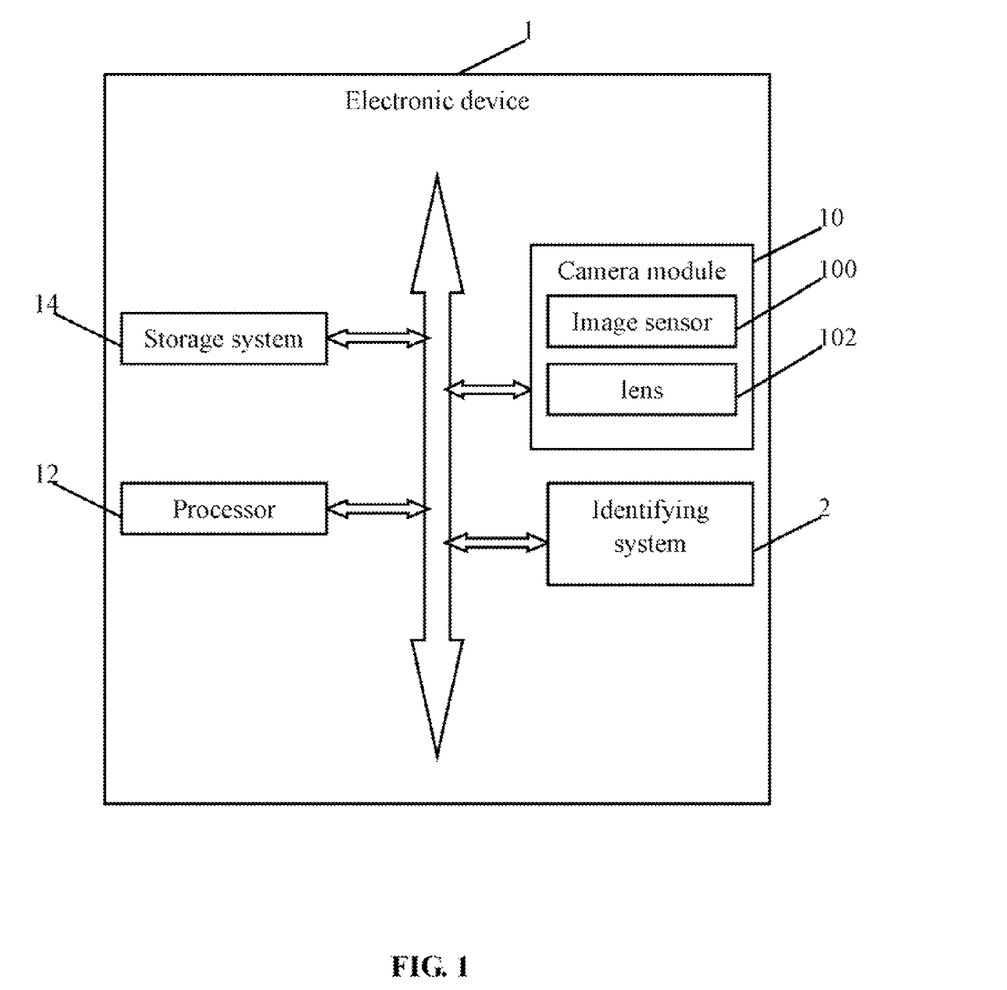
FIG. 1 is a block diagram of one embodiment of an electronic device including an identifying system.

FIG. 1 is a block diagram of one embodiment of an electronic device 1 including an identifying system 2. The identifying system 2 may be used to control access to the electronic device 1 by identifying an iris of an eye of a user of the electronic device 1. The electronic device 1 may be a mobile phone, a personal digital assistant (PDA), a handheld computer, or any other kind of computing device.

In one embodiment, the electronic device 1 also includes a camera module 10, a processor 12, and a storage system 14. The camera module 10 is used to capture an iris of an eye of a user who wants to log into the electronic device 1. The camera module 10 may include an image sensor 100 and a lens 102. The image sensor 100 may be a charged coupled device (CCD) or a complementary metal-oxide-semiconductor transistor (CMOS) for capturing images.

The processor 12 executes one or more computerized operations of the electronic device 1 and other applications, to provide functions of the electronic device 1. The storage system 14 stores one or more programs, such as programs of an operating system, other applications of the electronic device 1, and various kinds of data, such as iris images, for example. In one embodiment, the electronic device 1 may be a mobile phone, and the storage system 14 may be a memory of the electronic device 1 or an external storage card, such as a memory stick, a subscriber identification module (SIM) card, a smart media card, a compact flash card, or any other type of memory card.

Figure 2:
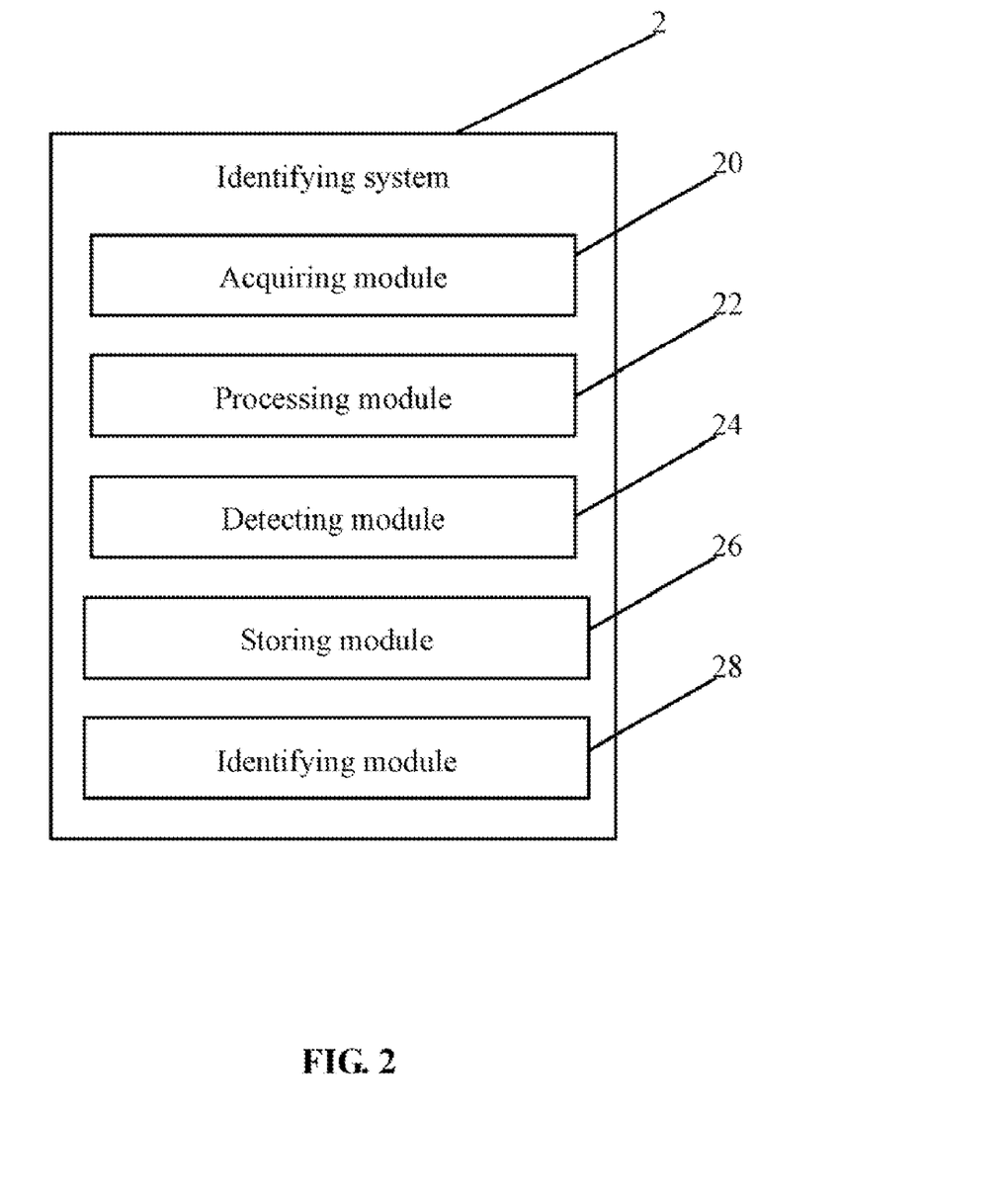
FIG. 2 is a block diagram of one embodiment of the identifying system.

FIG. 2 is a block diagram of one embodiment of the identifying system 2. In one embodiment, the identifying system 2 includes an acquiring module 20, a processing module 22, a detecting module 24, a storing module 26, and an identifying module 28. The modules 20, 22, 24, 26, and 28 may comprise one or more computerized programs to be executed by the processor 12 to perform one or more operations of the electronic device 1. Details of these operations will be provided below.

First, iris characteristic information of one or more authorized users of the electronic device 1 is stored into the storage system 14. The iris characteristic information may be used to control access to the electronic device 1. The iris characteristic information of an authorized user can be obtained as follows.

The acquiring module 20 controls the camera module 10 to capture an iris of an eye of an authorized user so as to acquire an original iris image.

The processing module 22 processes the original iris image. Specifically, the processing module 22 converts the original iris image into a black and white image. Then, the processing module 22 reduces luminance of the original iris image, and enhances contrast of the original iris image.

Figure 5:
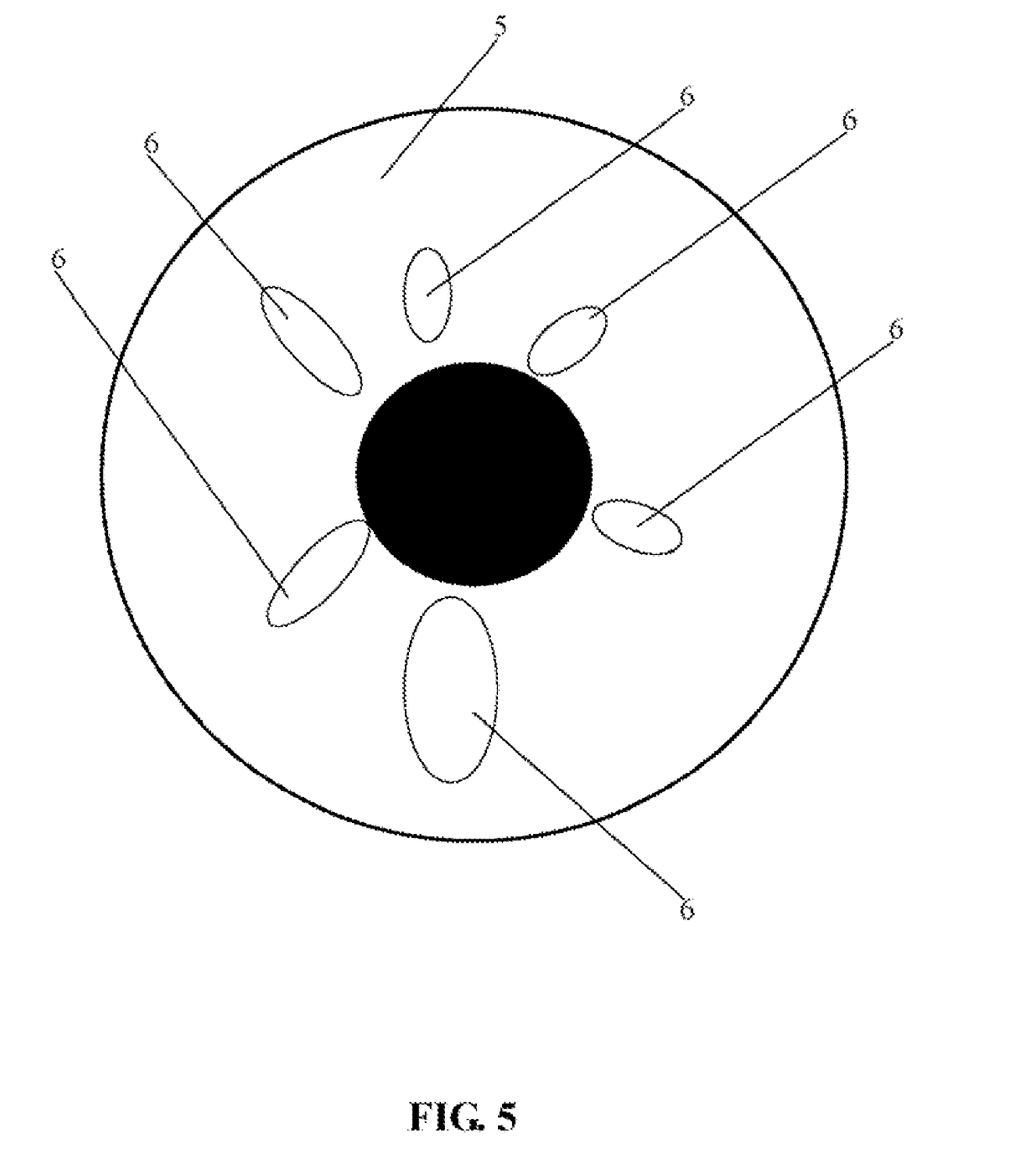
FIG. 5 is a schematic diagram of one embodiment of an iris image.
Figure 6:
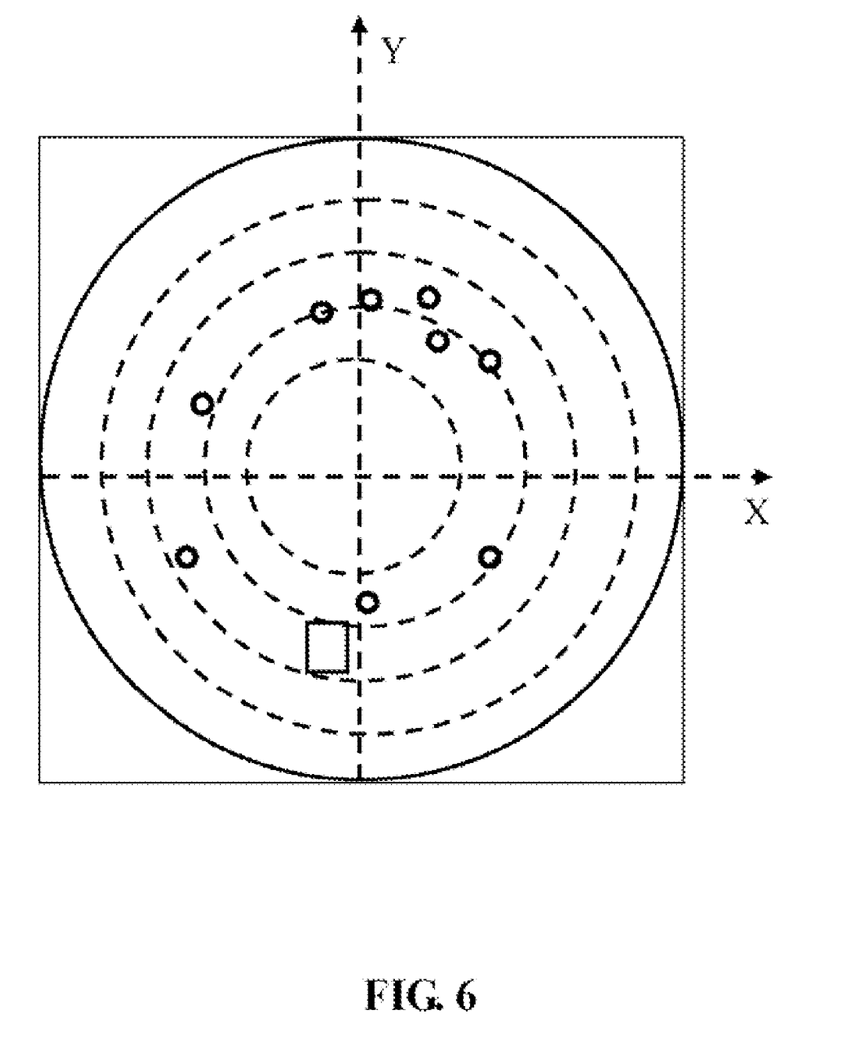
FIG. 6 is a schematic diagram of one embodiment of the iris image having a coordinate system.
Figure 7:
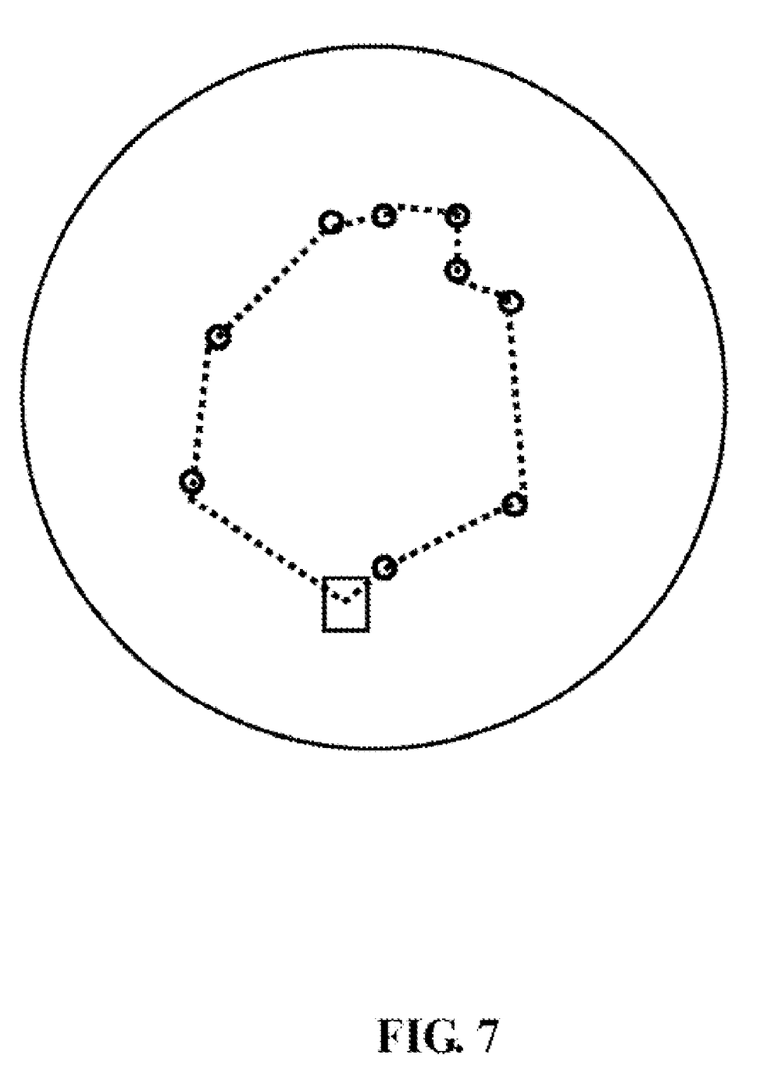
FIG. 7 is a schematic diagram of one embodiment of a linked shape of characteristic points of the iris image.

The detecting module 24 detects original iris characteristic points in the original iris image. The original iris characteristic points include a main characteristic point and sub-characteristic points. As shown in FIG. 5, an iris 5 includes a plurality of recesses 6. In one embodiment, the main characteristic point is a biggest recess in the original iris image, and the sub-characteristic points are recesses in the original iris image except the biggest recess. Referring to FIG. 6 and FIG. 7, a square represents the main characteristic point (e.g., the biggest recess). A plurality of circles represent the sub-characteristic points (e.g., other recesses except the biggest recess). The iris 5 further includes filaments, coronals, stripes, for example. In another embodiment, the main characteristic point and the sub-characteristic points may be the filaments, the coronals, or the stripes.

The detecting module 24 further computes original iris characteristic values according to the original iris characteristic points. In one embodiment, the original iris characteristic values may include a characteristic point count, characteristic point coordinates, a linked shape of the characteristic points, and relative positions between adjacent characteristic points. As an example shown in FIG. 6 and FIG. 7, the characteristic point count is 10.

As shown in FIG. 6, the detecting module 24 may construct a coordinate system on the original iris image so as to determine coordinates of each of the original characteristic points. The relative positions between adjacent characteristic points may be confirmed according to the coordinates of each of the original characteristic points. As shown in FIG. 7, the linked shape of the original characteristic points is acquired by linking each original characteristic point to a nearest original characteristic point.

The storing module 26 stores the original iris characteristic points and the original iris characteristic values of the authorized user into the storage system 14. By utilizing the acquiring module 20, the processing module 22, the detecting module 24, and the storing module 26, more original iris characteristic points and original iris characteristic values of other authorized users may be acquired and stored into the storage system 14.

If a user wants to log into the electronic device 1, the acquiring module 20 controls the camera module 10 to capture an iris of an eye of the user so as to acquire a login iris image.

The processing module 22 processes the login iris image by converting the login iris image into a black and white image, reducing luminance of the login iris image, and enhancing contrast of the login iris image.

The detecting module 24 detects iris characteristic points in the login iris image, and computes iris characteristic values according to the detected iris characteristic points. The iris characteristic points in the login iris image also include a main characteristic point and sub-characteristic points. The iris characteristic values also include a characteristic point count, characteristic point coordinates, a linked shape of the characteristic points, and relative positions between adjacent characteristic points.

The identifying module 28 determines if the computed iris characteristic values match the original iris characteristic values of one or more authorized users. A comparison standard may be predefined by the identifying module 28 to compare the iris characteristic values with the original iris characteristic values. In one embodiment, the comparison standard may include, but are not limited to the following items: main characteristic point comparison, sub-characteristic point comparison, and coordinates comparison.

If coordinates of a main characteristic point of the login iris image is the same as coordinates of a main characteristic point of an original iris image, the main characteristic point comparison is passed. If a count of sub-characteristic points of the login iris image is more than a predetermined percentage of a count of sub-characteristic points of an original iris image, the sub-characteristic point comparison is passed. If coordinates of sub-characteristic points of the login iris image matches more than the predetermined percentage of coordinates of sub-characteristic points of an original iris image, the coordinates comparison is passed. If the above mentioned items are all passed, the iris characteristic values are determined to match the original iris characteristic values of an authorized user. In one embodiment, the predetermined percentage is 60%.

If the iris characteristic values match the original iris characteristic values of the one or more authorized users, the identifying module 28 grants access to the electronic device 1. Otherwise, if the iris characteristic values do not match the original iris characteristic values of the one or more authorized users, the identifying module 28 denies access to the electronic device 1.

Figure 3:
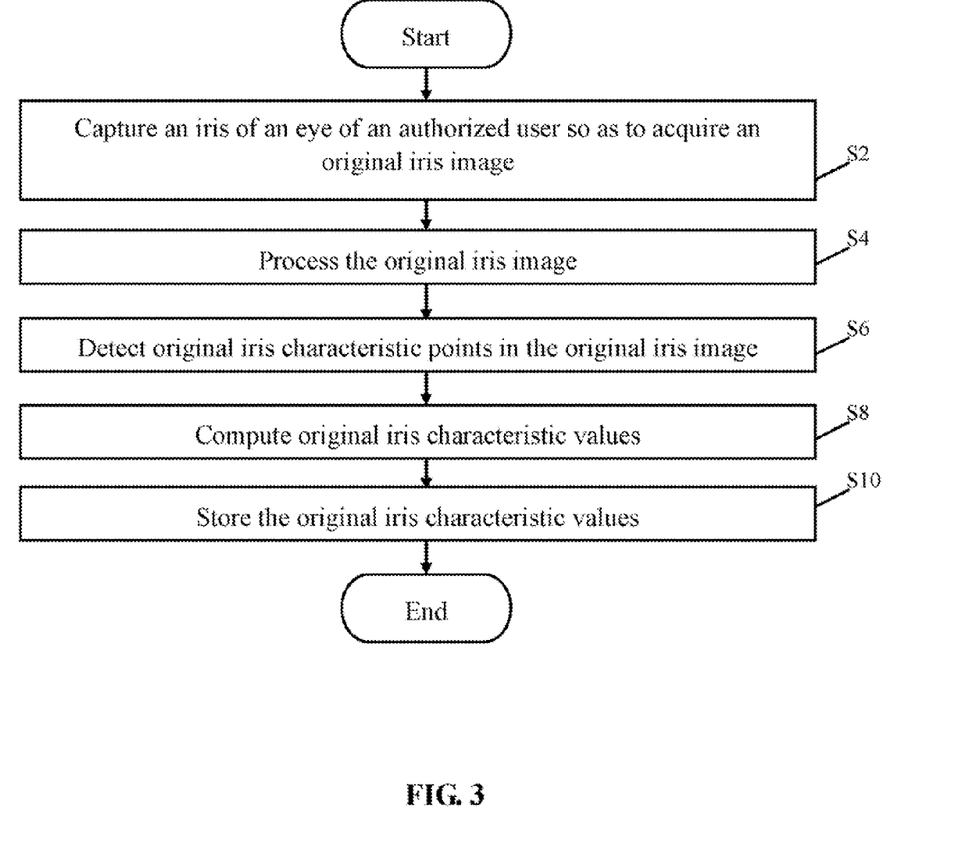
FIG. 3 is a flowchart of one embodiment of a method for acquiring information of an authorized user of the electronic device of FIG. 1.

FIG. 3 is a flowchart of one embodiment of a method for acquiring information of an authorized user of an electronic device 1. Depending on the embodiment, additional blocks may be added, others removed, and the ordering of the blocks may be replaced.

In block S2, the acquiring module 20 controls the camera module 10 to capture an iris of an eye of an authorized user so as to acquire an original iris image.

In block S4, the processing module 22 processes the original iris image. As mentioned above, the processing module 22 converts the original iris image into a black and white color image. Then, the processing module 22 reduces luminance of the original iris image, and enhances contrast of the original iris image.

In block S6, the detecting module 24 detects original iris characteristic points in the original iris image. The original iris characteristic points include a main characteristic point and sub-characteristic points.

In block S8, the detecting module 24 computes original iris characteristic values according to the original iris characteristic points. As mentioned above, the original iris characteristic values may include a characteristic point count, characteristic point coordinates, a linked shape of the characteristic points, and relative positions between adjacent characteristic points.

In block S10, the storing module 26 stores the original iris characteristic points and the original iris characteristic values of the authorized user into the storage system 14.

More original iris characteristic points and original iris characteristic values of other authorized users may be acquired and stored into the storage system 14 by repeating block S2 to block S10.

Figure 4:
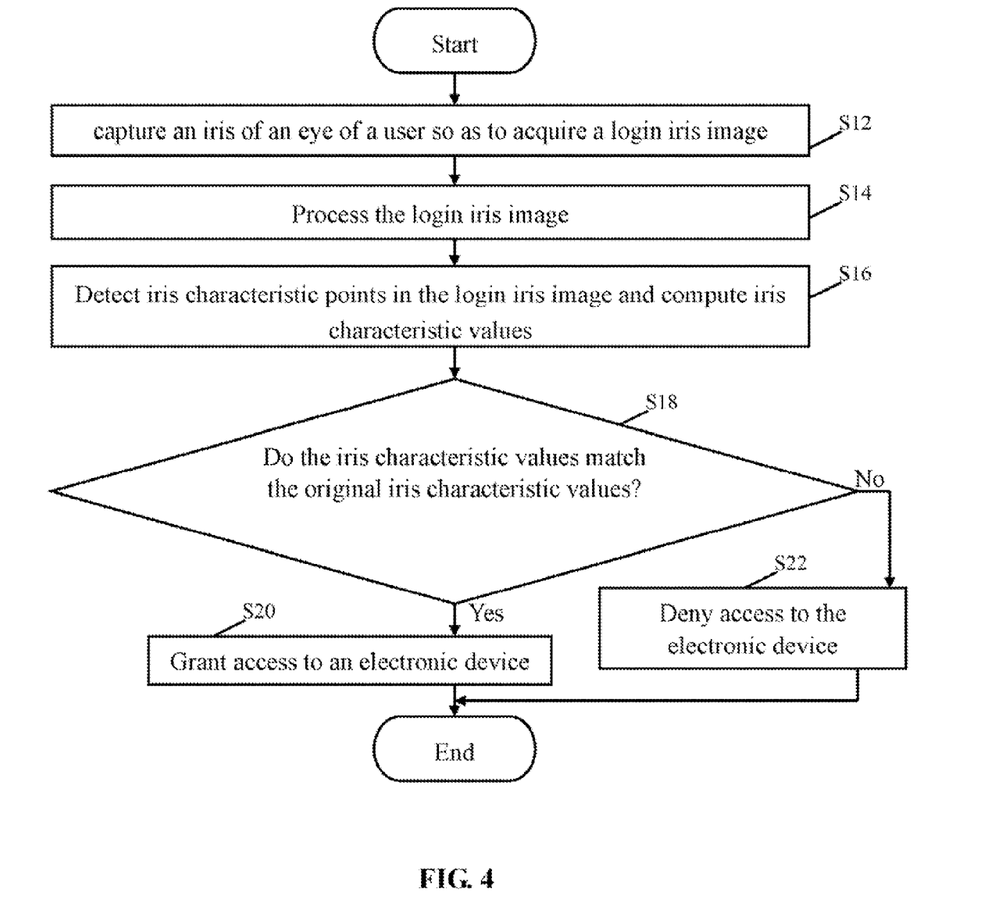
FIG. 4 is a flowchart of one embodiment of a method for controlling access to the electronic device of FIG. 1.

FIG. 4 is a flowchart of one embodiment of a method for controlling access to an electronic device 1. Depending on the embodiment, additional blocks may be added, others removed, and the ordering of the blocks may be replaced.

In block S12, the acquiring module 20 controls the camera module 10 to capture an iris of a user wants to log into the electronic device 1 so as to acquire a login iris image.

In block S14, the processing module 22 processes the login iris image by converting the login iris image into a black and white image, reducing luminance of the login iris image, and enhancing contrast of the login iris image.

In block S16, the detecting module 24 detects iris characteristic points in the login iris image, and computes iris characteristic values according to the detected iris characteristic points.

In block S18, the identifying module 28 determines if the computed iris characteristic values match the original iris characteristic values of one or more authorized users.

If the iris characteristic values match the original iris characteristic values of the one or more authorized users, in block S20, the identifying module 28 grants access to the electronic device 1. Otherwise, if the iris characteristic values do not match the original iris characteristic values of the one or more authorized users, in block S22, the identifying module 28 denies access to the electronic device 1.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for controlling access to an electronic device, the electronic device having a storage system and a camera module, the method comprising:

controlling the camera module to capture an iris of an eye of a user so as to acquire a login iris image from the camera module;
detecting iris characteristic points in the login iris image, the iris characteristic points comprising a main characteristic point and sub-characteristic points, the main characteristic point being a biggest recess in the login iris image and the sub-characteristic points being recesses in the login iris image except the biggest recess;
computing iris characteristic values according to the detected iris characteristic points;
obtaining original iris characteristic values of one or more authorized users of the electronic device from the storage system;
determining if the computed iris characteristic values match the original iris characteristic values of the one or more authorized users; and
granting access to the electronic device if the iris characteristic values match the original iris characteristic values of the one or more authorized users.

2. The method according to claim 1, further comprising:
denying access to the electronic device if the iris characteristic values do not match the original iris characteristic values of the one or more authorized users.

3. The method according to claim 1, further comprising:
converting the login iris image into a black and white image;
reducing luminance of the login iris image; and
enhancing contrast of the login iris image.

4. The method according to claim 1, wherein the original iris characteristic values of the one or more authorized users are computed by steps of:
controlling the camera module to capture an iris of an eye of an authorized user so as to acquire an original iris image;
detecting original iris characteristic points in the original iris image, and computing the original iris characteristic values according to the original iris characteristic points;
storing the original iris characteristic points and the original iris characteristic values of the authorized user into the storage system.

5. The method according to claim 4, wherein each of the original iris characteristic values and the iris characteristic values comprises a characteristic point count, characteristic point coordinates, a linked shape of the characteristic points, and relative positions between adjacent characteristic points.

6. The method according to claim 4, wherein the original iris characteristic points comprise a main characteristic point and sub-characteristic points, the main characteristic point is a biggest recess in the original iris image, and the sub-characteristic points are recesses in the original iris image except the biggest recess.

7. The method according to claim 1, further comprising:
defining a comparison standard to compare the iris characteristic values with the original iris characteristic values, the comparison standard comprising a main characteristic point comparison, a sub-characteristic point comparison, and a coordinates comparison.

8. An electronic device, the electronic device comprising:
a camera module;
a storage system that stores original iris characteristic values of one or more authorized users of the electronic device;
at least one processor; and
one or more programs stored in the storage system and being executable by the at least one processor, the one or more programs comprising:
an acquiring module operable to control the camera module to capture an iris of an eye of a user so as to acquire a login iris image;
a detecting module operable to detect iris characteristic points in the login iris image, and compute iris characteristic values according to the detected iris characteristic points, the iris characteristic points comprising a main characteristic point and sub-characteristic points, the main characteristic point being a biggest recess in the login iris image and the sub-characteristic points being recesses in the login iris image except the biggest recess; and
an identifying module operable to determine if the computed iris characteristic values match the original iris characteristic values of the one or more authorized users, and grant access to the electronic device if the iris characteristic values match the original iris characteristic values of the one or more authorized users.

9. The electronic device according to claim 8, wherein the identifying module is further operable to deny access to the electronic device if the iris characteristic values do not match the original iris characteristic values of the one or more authorized users.

10. The electronic device according to claim 8, wherein the one or more programs further comprises a processing module operable to process the login iris image by converting the login iris image into a black and white image, reducing luminance of the login iris image, and enhancing contrast of the login iris image.

11. The electronic device according to claim 8, wherein:
the acquiring module is further operable to control the camera module to capture an iris of an eye of an authorized user so as to acquire an original iris image;
the detecting module is further operable to detect original iris characteristic points in the original iris image, and compute the original iris characteristic values according to the original iris characteristic points;
the one or more programs further comprise a storing module, the storing module is operable to store the original iris characteristic points and the original iris characteristic values of the authorized user into the storage system.

12. The electronic device according to claim 11, wherein each of the original iris characteristic values and the iris characteristic values comprises a characteristic point count, characteristic point coordinates, a linked shape of the characteristic points, and relative positions between adjacent characteristic points.

13. The electronic device according to claim 11, wherein the original iris characteristic points comprise a main characteristic point and sub-characteristic points, the main characteristic point is a biggest recess in the original iris image, and the sub-characteristic points are recesses in the original iris image except the biggest recess.

14. The electronic device according to claim 8, wherein the identifying module is further operable to define a comparison standard to compare the iris characteristic values with the original iris characteristic values, the comparison standard comprising a main characteristic point comparison, a sub-characteristic point comparison, and a coordinates comparison.

15. A non-transitory storage medium storing a set of instructions, the set of instructions capable of being executed by a processor to perform a method for controlling access to an electronic device, the electronic device having a storage system and a camera module, the method comprising:

controlling the camera module to capture an iris of an eye of a user so as to acquire a login iris image from the camera module;

detecting iris characteristic points in the login iris image, the iris characteristic points comprising a main characteristic point and sub-characteristic points, the main characteristic point being a biggest recess in the login iris image and the sub-characteristic points being recesses in the login iris image except the biggest recess;

computing iris characteristic values according to the detected iris characteristic points;

obtaining original iris characteristic values of one or more authorized users of the electronic device from the storage system;

determining if the computed iris characteristic values match the original iris characteristic values of the one or more authorized users; and granting access to the electronic device if the iris characteristic values match the original iris characteristic values of the one or more authorized users.

16. The storage medium as claimed in claim 15, wherein the method further comprises:

denying access to the electronic device if the iris characteristic values do not match the original iris characteristic values of the one or more authorized users.

17. The storage medium as claimed in claim 15, wherein the method further comprises:

converting the login iris image into a black and white image;

reducing luminance of the login iris image; and enhancing contrast of the login iris image.

18. The storage medium as claimed in claim 15, wherein the original iris characteristic values of the one or more authorized users are computed by steps of:

controlling the camera module to capture an iris of an eye of an authorized user so as to acquire an original iris image;

detecting original iris characteristic points in the original iris image, and computing the original iris characteristic values according to the original iris characteristic points;

storing the original iris characteristic points and the original iris characteristic values of the authorized user into the storage system.

19. The storage medium as claimed in claim 18, wherein each of the original iris characteristic values and the iris characteristic values comprises a characteristic point count, characteristic point coordinates, a linked shape of the characteristic points, and relative positions between adjacent characteristic points.

20. The storage medium as claimed in claim 18, wherein the original iris characteristic points comprise a main characteristic point and sub-characteristic points, the main characteristic point is a biggest recess in the original iris image, and the sub-characteristic points are recesses in the original iris image except the biggest recess.

* * * * *